UNITED STATES PATENT OFFICE.

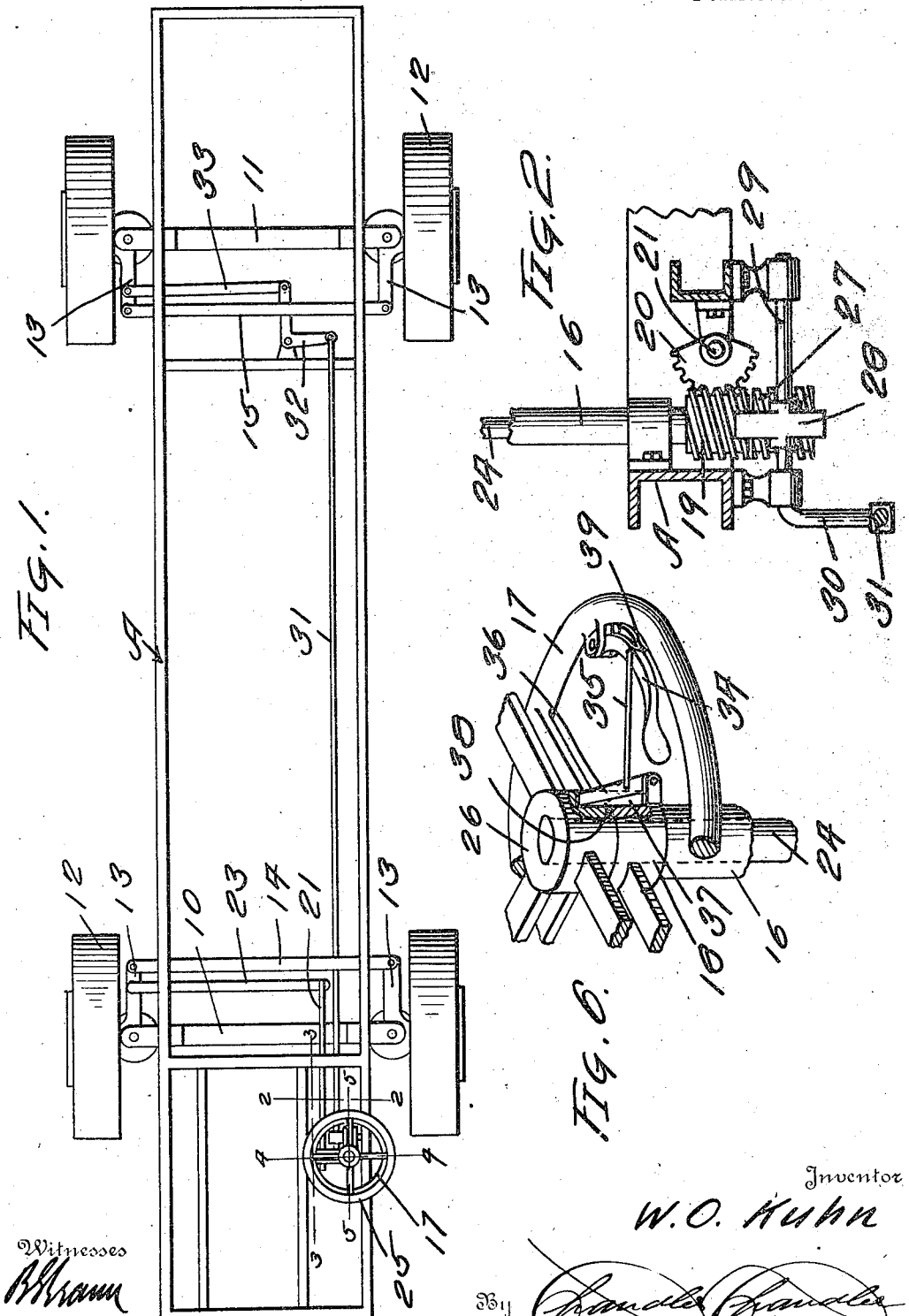

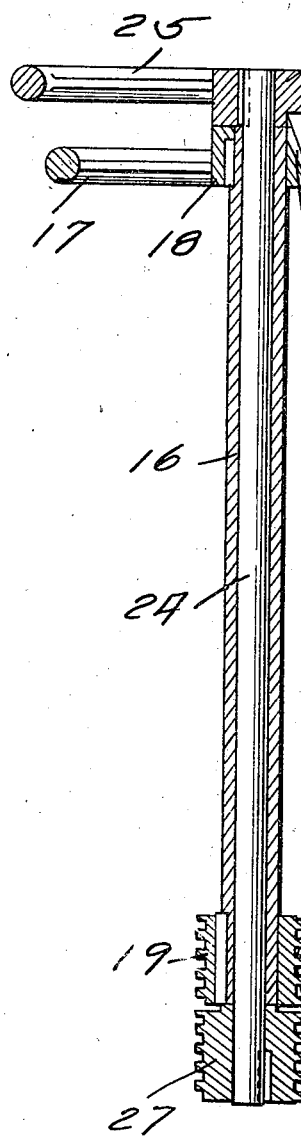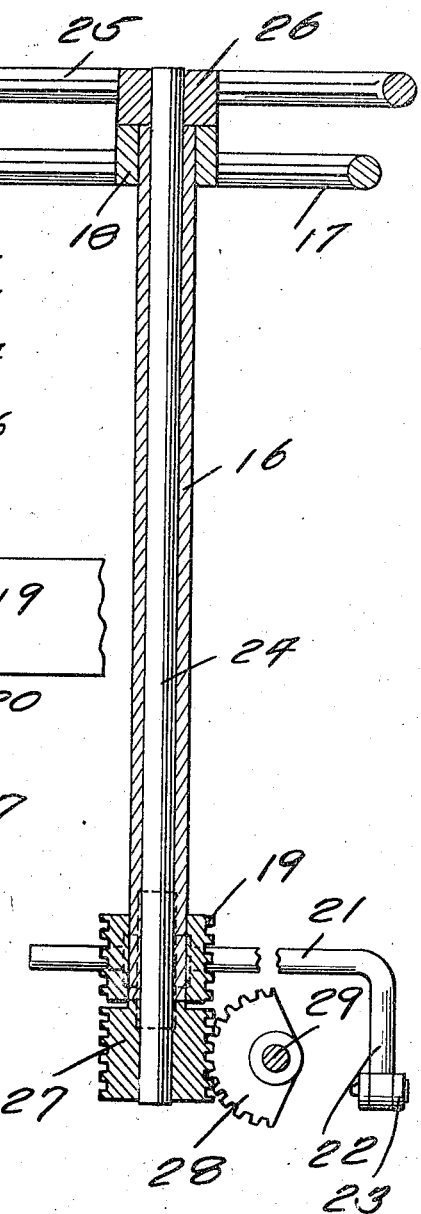

WILLIAM O. KUHN, OF WEBER, WASHINGTON.

STEERING-GEAR FOR MOTOR-VEHICLES.

1,187,341.      Specification of Letters Patent.      Patented June 13, 1916.

Application filed July 28, 1915. Serial No. 42,396.

*To all whom it may concern:*

Be it known that I, WILLIAM O. KUHN, a citizen of the United States, residing at Weber, in the county of Grant, State of Washington, have invented certain new and useful Improvements in Steering-Gears for Motor-Vehicles; and I do hereby declare the following to be a full, clear, and exact description of the invention, such as will enable others skilled in the art to which it appertains to make and use the same.

This invention relates to steering gears for motor vehicles.

It is my purpose to provide an improved steering gear for motor vehicles for use in connection with that type of vehicle wherein the steering is effected by movement of all four wheels, the steering gear being so constructed and arranged that steering movement can be imparted simultaneously to all four wheels or independently to the front and rear wheels.

With the above and other purposes in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a four wheel drive motor vehicle having the improved steering gear as ciated therewith, various parts of the vehicle being omitted for the sake of clearness; Fig. 2, a section on the line 2—2 of Fig. 1; Fig. 3, a section on the line 3—3 of Fig. 1; Fig. 4, a section on the line 4—4 of Fig. 1; Fig. 5, a section on the line 5—5 of Fig. 1, and Fig. 6, a fragmental perspective view showing the mechanism for locking the steering shafts of the front and rear wheels together for rotation in unison.

Referring to the drawings A indicates the frame of the motor vehicle, same being supported by front and rear axles 10 and 11 respectively. Mounted on the ends of these axles through the medium of steering knuckles are wheels 12 and each steering knuckle is provided with the usual steering arm 13. The steering arms 13 associated with the front axle are joined by a connecting rod 14, while the steering arms 13 associated with the rear axle are joined by a connecting rod 15. Rotatably mounted upon the frame A is a tubular steering shaft 16 having fixed on its upper end a hand wheel 17 including a hub 18. Fixed on the lower end of the shaft 16 is a worm 19 which meshes with a worm segment 20 fixed upon a shaft 21, the latter being rotatably mounted on and extending longitudinally of the frame A. This shaft 21 is provided with an arm 22 the free end of which has secured thereto one end of a link 23, the other end of said link being connected to one of the steering arms 13 associated with the front axle 10. By this construction it will be obvious that by rotating the hand wheel 17 desired steering movement can be imparted to the wheels 12 which are associated with the front axle 10.

Rotatably mounted within the shaft 16 is a shaft 24 which has fixed on the upper end thereof a hand wheel 25 including a hub 26. Fixed on the lower end of the shaft 24 is a worm 27 which meshes with a worm segment 28 fixed on a shaft 29 rotatably mounted on the frame A and extending transversely of the latter. This shaft 29 is provided with an arm 30 the free end of which has connected thereto one end of a link 31. The other end of this link 31 is connected to one arm of a bell crank 32 which latter is suitably pivoted upon the frame A. The other arm of the bell crank 32 is connected by a link 33 with one of the steering arms 13 associated with the rear axle 11. By this construction it will be obvious that upon rotating the shaft 24 through the medium of the hand wheel 25 the necessary steering movement can be imparted to the wheels 12 associated with the rear axle.

In order to impart steering movement simultaneously to the front and rear wheels by operating the hand wheel 17 there is pivotally mounted on the hand wheel 17 a lever 34 which is connected by a link 35 with a locking pawl 36, the latter being also pivotally mounted on the hand wheel 17. The pawl 36 is adapted to engage in recesses 37 and 38 formed respectively in the hubs 18 and 26 and in this way lock the shafts 16 and 24 together for rotation in unison. The pawl 36 is normally held in the recesses 37 and 38 by means of a spring 39. If it is desired to steer the front and rear wheels independently the lever 34 is moved toward the rim of the wheel 17 and the pawl 36 will thus be disengaged from the recesses 37 and 38 when the shafts 16 and 24 can be rotated independently.

What is claimed is:—

The combination with a vehicle, of front and rear axles, pivotally mounted wheels on the ends of said axles respectively, a tubular steering shaft operatively connected to the wheels of one axle, a solid steering shaft rotatable within the tubular shaft and operatively connected with the wheels of the other axle, hand wheels on said shafts respectively for effecting rotation thereof, said hand wheels including hubs provided with recesses, a pawl pivoted on one of said hand wheels and engageable in said recesses to lock the shafts together, and a lever pivoted on the hand wheel carrying the pawl and connected to the latter whereby said pawl may be disengaged from the recesses to permit independent rotation of said shafts.

In testimony whereof, I affix my signature, in the presence of two witnesses.

WILLIAM O. KUHN.

Witnesses:
  FRANK J. KOLMAN,
  C. TOUSEY TAYLOR.